United States Patent [19]

Moribe et al.

[11] Patent Number: 4,825,313
[45] Date of Patent: Apr. 25, 1989

[54] METHOD FOR ADJUSTABLY POSITIONING A TRANSDUCER FOR A DISC DRIVE

[75] Inventors: Yoshihiro Moribe, Chigasaki; Mikio Takahashi; Osamu Beppu, both of Odawara, all of Japan

[73] Assignee: Hitachi, Ltd., Tokyo, Japan

[21] Appl. No.: 8,251

[22] Filed: Jan. 29, 1987

[30] Foreign Application Priority Data

Jan. 29, 1986 [JP] Japan .................... 61-15652

[51] Int. Cl.$^4$ ............................. G11B 5/596
[52] U.S. Cl. .................... 360/77.02; 318/696
[58] Field of Search ............ 318/685, 696; 360/75, 360/77, 78, 105, 106, 109

[56] References Cited

U.S. PATENT DOCUMENTS

| | | | |
|---|---|---|---|
| 4,513,331 | 4/1985 | Baker et al. | 360/75 |
| 4,555,738 | 11/1985 | Murayama et al. | 360/75 |
| 4,562,494 | 12/1985 | Bond | 360/75 |
| 4,608,618 | 8/1986 | Sturtevant-Stuart | 360/75 |

OTHER PUBLICATIONS

IBM Tech. Disc. Bulletin, vol. 26, No. 1, Jun. 1983, Head-Alignment Technique, W. A. Overby, pp. 171–173.
IBM Tech. Disc. Bulletin, vol. 25, No. 7A, Dec. 1982, Flexible File Head Alignment, J. G. Goodwin, pp. 3241–3243.

*Primary Examiner*—Alan Faber
*Assistant Examiner*—David L. Robertson
*Attorney, Agent, or Firm*—Antonelli, Terry & Wands

[57] ABSTRACT

A method of adjusting the position of a magnetic head in a magnetic head positioning mechanism positions the magnetic head at a target track on a magnetic disk. Since a floppy disk system is so designed as to make a floppy disk replaceable, it is necessary to adjust accurately the position of the magnetic head from the position of a spindle. According to the present invention, the position of the magnetic head is adjusted by the method wherein the displacement of an amount of deviation from a prescribed track in the magnetic head positioning mechanism is calculated beforehand, the amount of deviation is sampled subsequently by moving the magnetic head, this sampled amount of deviation is compared with the aforesaid calculated displacement to know the maximum and minimum values of the amounts of deviation on the track of movement of the magnetic head, and the adjustment is implemented on the basis of these values.

18 Claims, 6 Drawing Sheets

METHOD FOR ADJUSTABLY POSITIONING A TRANSDUCER FOR A DISC DRIVE

BACKGROUND OF THE INVENTION

1. Field of the Invention

The present invention relates to a method of adjusting the position of an information record reproducing transducer (e.g., a magnetic head) employed for a medium-replacing type information storage system such as a flexible disk system.

In the medium-replacing type information storage system such as the flexible disk system, the distance of the information record reproducing transducer (hereinafter called magnetic head) from the center of a spindle for driving a recording medium must be set at a definite value so that the relative position between the magnetic head and recording tracks of said medium may not be varied even when the medium is replaced. In this regard, adjustment has been conducted in a flexible disk system having only a magnetic head for one side of the recording medium, by measuring optically and directly the gap position of the magnetic head from the center of the spindle. In a flexible disk system whereon a magnetic head for both sides of the recording medium is mounted, on the other hand, it is impossible to measure optically an opposite head gap, and therefore a disk for adjustment wherefrom specific signals for position measurement can be obtained, such as disclosed in the Japanese Official Gazette on Japanese Patent Publication No 7142/1984, for instance, is used therein generally. According to the adjusting method wherein said disk for adjustment is used, the disk for adjustment is set in the flexible disk system, the correctness of a position of the magnetic head is observed on the basis of signals obtained from the magnetichead, and the position of the magnetic head is adjusted in accordance with the result of the observation.

This method enables the measurement of an amount of deviation (hereinafter called off-track amount) from an ideal position of a double-side head in some specific track for adjustment, and therefore it is possible to conduct adjustment so that the off-track amount of each magnetic head be minimum. However, this method can not always lessen the maximum value of the off-track amount in all the recording tracks of a disk, since the adjustment is conducted only with the specific track taken in view. For instance, in a magnetic head positioning mechanism disclosed in U.S. Pat. No. 4,161,004, which comprises a step motor, a belt wound once on a pulley of the step motor and a carriage fitted with said belt and supporting a magnetic head, a positioning error of the magnetic head results from the precision of a feed angle of the step motor serving as a driving source, errors in the radius dimension and eccentricity of the pulley fitted to the shaft of the step motor, an error in the thickness of the belt wound on the pulley, hysteresis generated in positioning the step motor as the result of the direction of movement, etc., and this has been a large hindrance to making high the density of tracks.

Various efforts have been made to reduce the respective factors of the above-stated errors, and in this relation, there have been proposed methods intended to improve a machining dimensional precision of each component, to reduce the hysteresis and improve the positioning precision as disclosed in the Japanese Official Gazettes on Japanese Patent Laid-Open No. 152723/1982 and Japanese Patent Laid-Open No. 152724/1982, and to remove errors in the eccentricity of the pulley and the thickness of the belt, from a structural point of view, as shown in the Official Gazette on Japanese Patent Publication No. 38783/1985. None of these methods, however, has succeeded in lessening the maximum error of all the recording tracks.

Such a system as shown in the foregoing Official Gazette on Japanese Patent Publication No. 7142/1984, in which specific signals for position measurement are written in a plurality of disks for all the recording tracks, has been marketed. In this system, however, it takes too much time and increases the number of recording tracks unreasonably to measure and adjust in advance errors occurring in writing the signals among a plurality of disks as well as an error in each recording track revealed when said signals are reproduced from all the tracks.

In the above-described prior arts, no consideration is given to the appropriate adjustment of the errors in all the recording tracks as well as to the quick measurement of said errors and the easy adjustment of the position of a magnetic head, and this has been a problem which hinders making high the density of tracks of the flexible disk system.

SUMMARY OF THE INVENTION

A first object of the present invention is to provide a method which enables such adjustment of a position of a magnetic head as diminishing an amount of deviation of the magnetic head in a movement track thereof.

The aforesaid object is achieved by measuring a positioning error resulting from the mechanical dimensional errors (in the radius of a pulley, the eccentricity of the pulley and the thickness of a belt) of a positioning mechanism, a positioning error resulting from a feed pitch (the angular precision of a step motor) of a driving element of the positioning mechanism, a positioning error resulting from the direction of movement of the step motor in positioning the same, and an error resulting from the offset of a double-side head, by calculating an amount of positional deviation in an adjusting track so that an off-track amount in the entire range of movement be averaged from off-track amounts obtained from the measurement of the aforesaid errors, and by adjusting a positioning mechanism element (including a magnetic head) on the basis of a value obtained from the above calculation.

BRIEF DESCRIPTION OF THE INVENTION

DESCRIPTION OF THE PREFERRED EMBODIMENTS (I) The following is a description of one embodiment of the present invention, and first the cause of off-tracks will be described.

Figure 3:
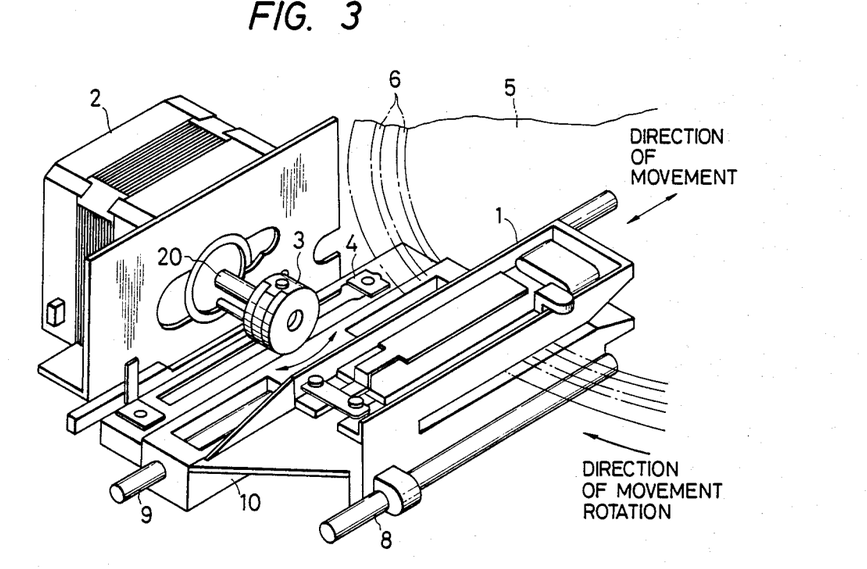
FIG. 3 is a perspective view of one example of a magnetic head positioning mechanism.

(A) As is shown in FIG. 3, the magnetic head positioning mechanism to which the present invention is applied comprises a step motor 2 which rotates and drives a shaft 20 in a stepped manner, a belt 4 which is wound once on a pulley 3 fitted to the end of said shaft 20 and the opposite end portions of which are fixed to a carriage 10, guide rails 8 and 9 which support said carriage 10 movably in the direction of the radius of a disk 5, and a magnetic head 1 which is mounted on said carriage 10 and moved to a target track 6 on the disk 5 by a linear motion into which the rotary motion of the step motor 2 is converted by the belt 4 and the guide rails 8 and 9.

In the magnetic head positioning mechanism having a construction as described above, off-tracks are thought to occur over all the tracks by the following causes (1) to (4). The phenomena of off-tracks occurring by these causes will be described hereunder one by one.

Figure 4A:
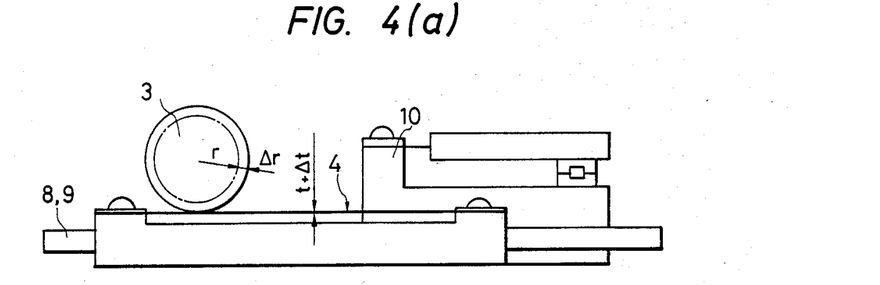
FIG. 4(a) and FIG. 4(b) are illustrations of an off-track amount resulting from a dimensional error of a pulley of the positioning mechanism shown in FIG. 3.
Figure 4B:
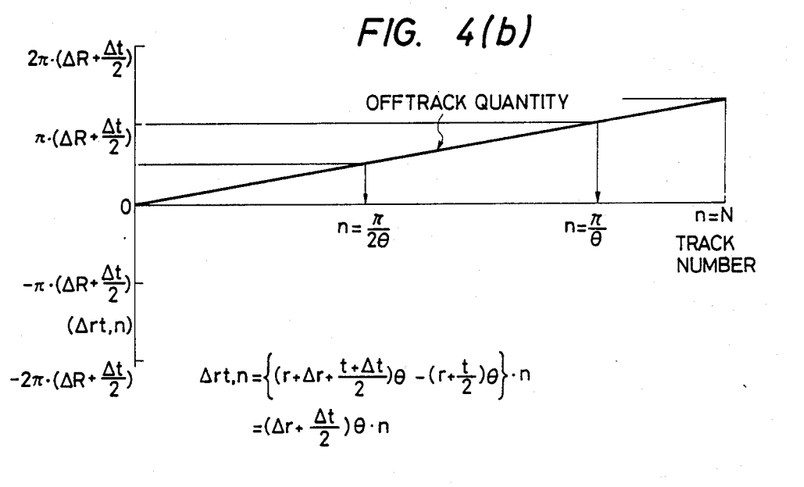

(1) Errors in the radius of a pulley and the thickness of a belt
(2) An error in eccentricity of the radius of the pulley
(3) An error in the rotational angle of a step motor
(4) Hysteresis of the step motor (B) An off-track resulting from the errors in the radius of the pulley and the thickness of the belt The off-track resulting from these errors will be described by using FIGS. 4(a) and 4(b). FIG. 4(a) is a schematic illustration of a construction of the positioning mechanism of FIG. 3 viewed from the side, and FIG. 4(b) is an illustration of the relationships between the track numbers denoting positions of a magnetic head and off-track amounts.

Assuming that the radius r of the pulley 3 shown in FIG. 4(a) has an error $\Delta r$, that the thickness t of the belt 4 has a dimensional error $\Delta t$ and that a movement of n tracks is made with the rotational angle of the pulley of a step motor per one track assumed to be $\theta$, a cumulative off-track amount ($\Delta rt$, n) is represented by the following equation (1).

$$\Delta rt, n = \left( \Delta r + \frac{\Delta t}{2} \right) \cdot \theta \cdot n \quad \text{equation (1)}$$

(wherein the off-track amount of the track No. 0 is assumed to be 0).

At a point where $\theta = \pi/100$ rad. and the track number n=100, for instance, an off-track amount is represented by $\Delta rt$, $$100 = \left( \Delta r + \frac{\Delta t}{2} \right),$$

and, given that $\Delta r = +0.003$ mm and $\Delta t = +0.003$ mm, an off-track of $\Delta rt$, $100 = +0.0045 \, \pi mm \approx 14.1 \, \mu m$ occurs.

Accordingly, the off-track amount resulting from the errors in the radius of the pulley and the thickness of the belt increases in proportion to an increase in the track number, as shown in FIG. 4(b).

Figure 5A:
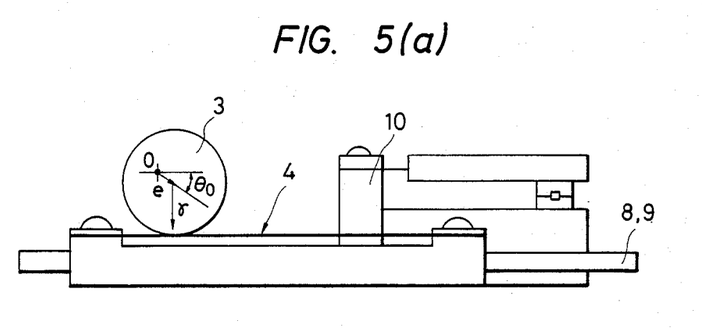
FIG. 5(a) to FIG. 5(c) are illustrations of an off-track amount resulting from an eccentric error of said pulley.
Figure 5B:
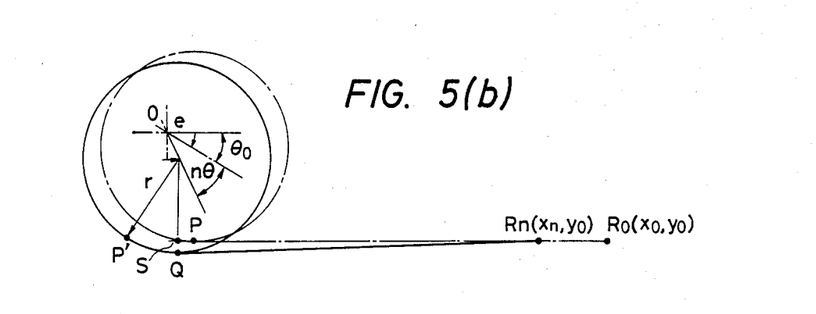

(C) An off-track resulting from an error in eccentricity of the radius of the pulley Next, assuming that the pulley 3 of the step motor 2 has an eccentricity e, that a directional angle of initial eccentricity if $\theta_c$ and that the rotational angle of the pulley is n$\theta$, as shown in FIGS. 5(a) and (b), at point R at which the belt 4 is fixed to the carriage 10 is transferred from an initial value $R_0$ ($x_0$, $y_0$) to $R_n$ ($x_n$, $y_0$) in FIG. 5(b). At this time, a cumulative error ($\Delta e$, n) in relation to an ideal position (a feed amount r.n.$\theta$) of the point R can be expressed by the following equation (2).

$$\Delta e, n = x_0 - x_n - r \cdot n \cdot \theta \quad \text{equation (2)}$$
$$= x_0 - (e \cos(\theta_0 + n\theta) + (\alpha^2 - \beta^2)^{\frac{1}{2}}) - r \cdot n \cdot \theta$$

where $$\alpha = \overline{R_nQ} \quad \text{equation (3)}$$
$$= ((x_0 - e \cos \theta_0)^2 + (r - y_0 + e \sin \theta_0)^2)^{\frac{1}{2}} - r \cdot n \cdot \theta,$$

$$\beta = \overline{QS} = r - y_0 + e \sin(\theta_0 + n\theta). \quad \text{equation (4)}$$

Figure 5C:
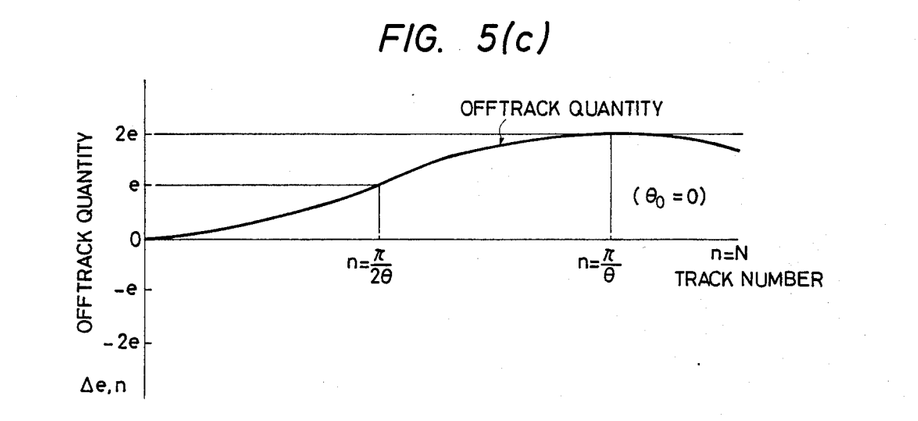

Given that $\theta_0 = 0$, $y_0 = r$ and $x_0 = 0$, for instance, the cumulative error is $\Delta e$, $100 = 2e$ at a point of $\theta = \pi/100$ rad. and n=100, for instance. This is shown in FIG. 5(c), and when e=0.005 mm, the error is $\Delta e$, $100 = 0.01$ mm $= 10 \, \mu m$.

(D) An off-track resulting from errors in the pulley and the belt

Figure 6:
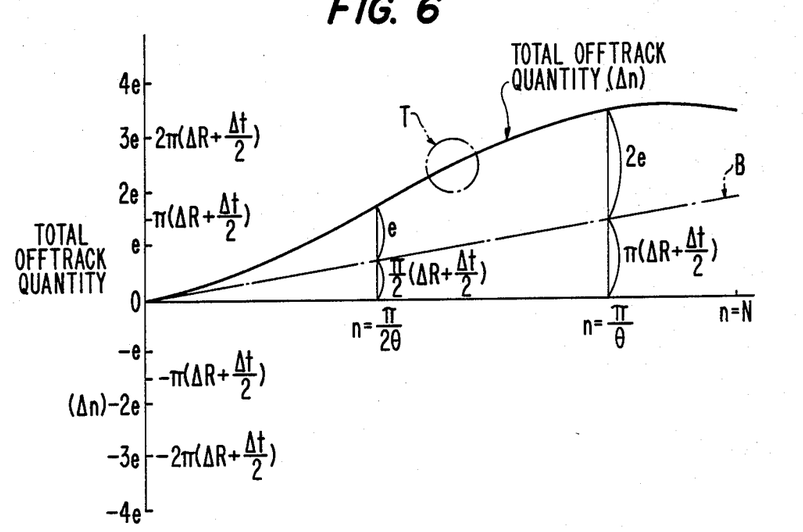
FIG. 6 is an illustration of an off-track amount resulting from an error in angular precision of a step motor.

The aforesaid off-tracks caused by the pulley and the belt are put together in a collective off-track amount n shown in FIG. 6. This off-track amount $\Delta n$ is a value obtained by adding the off-track amount ($\Delta rt$, n) shown in FIG. 4(b) to the off-track amount ($\Delta e$, n) shown in FIG. 5(c).

(F) An off-track caused by the step motor

Figure 7:
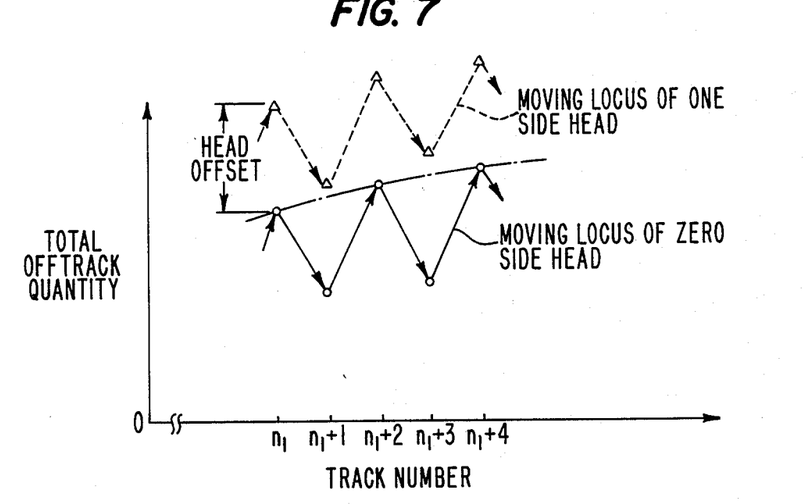
FIG. 7 is an illustration of an off-track amount in an enlarged portion T of FIG. 6.

Step motors are so manufactured as to have a characteristic of a step angle of 1.8° (i.e., the rotational angle of one step thereof is 1.8°) for instance. However, an error in the step angle resulting from an assembly precision is not fully eliminated. Strictly speaking, accordingly, the step motors rotate with a minute error, and therefore a magnetic head moved by this rotation deviates in a minute degree from its target position in movement. FIG. 7 shows an off-track caused by these step motors and added to the collective off-track amount $\Delta n$ of FIG. 6. An amount of this off-track varies up and down as shown in the figure. When a double-side head is used, in addition, a head offset occurs between a 0-side head and a 1-side head as indicated by broken lines drawn upward and downward in FIG. 7.

Thus, the off-track is caused also by the step motors themselves, as above described. As for the off-track of this kind, please refer to the description of U.S. Pat. No. 4,490,662 invented by Moribe.

(II) As above described, the off-track occurs by the various causes described in the foregoing items (A) to (F). Taking these causes into consideration collectively, the present invention conducts adjustment of the position of a head so that the off-track of the head be lessened, while it is also necessary to reduce said causes separately.

A description will be made hereunder on one embodiment of the present invention by using FIGS. 1 and 2.

(a) In the case when a step motor having a four-phase fixed-pole winding is employed, for instance, the magnetic head in the present embodiment is moved by a method wherein a one-track movement of the head is executed by two steps of the motor. This method of movement enables the highly-precise feeding of the head as is shown in the foregoing U.S. Pat. No. 4,490,662, enabling the reduction of the effect of an off-track due to an assembling error of the aforesaid step motor.

Figure 1:
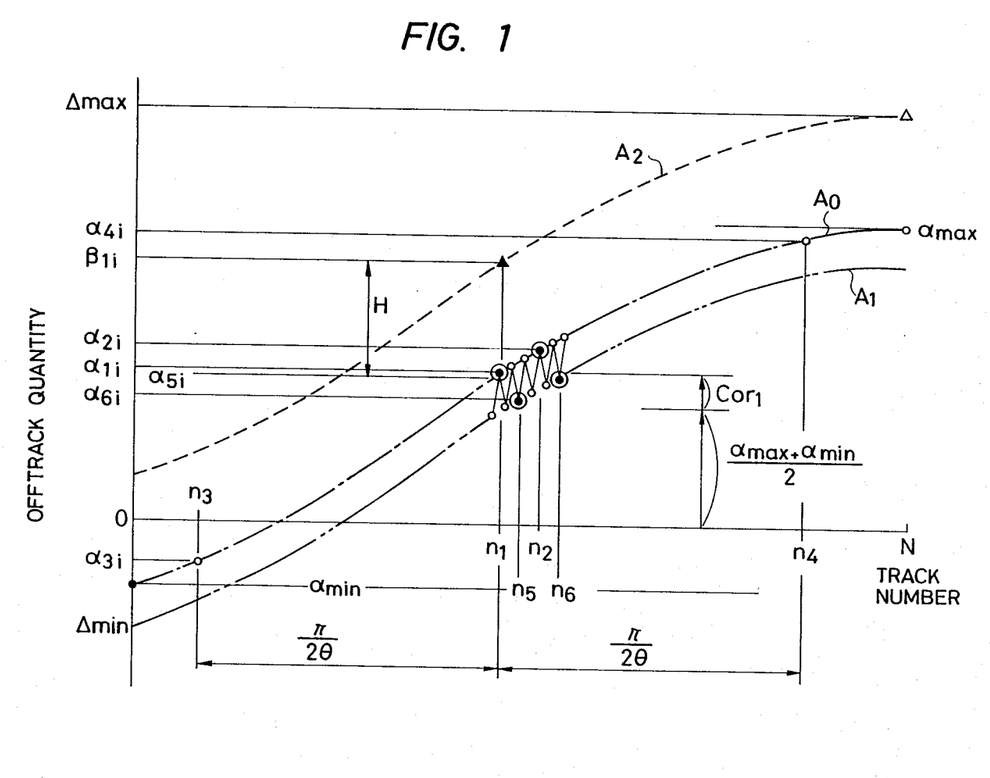
FIGS. 1 and 2 are graphs showing a variation in an off-track over all the tracks.

Positions (track numbers) of the head and the state of off-tracks in the case when this method of movement is used are indicated by an alternate long and short dash line $A_0$ in FIG. 1.

(b) The adjusting method of the magnetic head according to the present embodiment is implemented in the following way. A first reference position is set at the substantially central one of all tracks. In FIG. 1, this first reference position is denoted by a track number $n_1$.

(c) Then, a track number $n_2$ denoting a second reference position is set near said track number $n_1$. This track number $n_2$ denotes a track at which the magnetic head is positioned by exciting the same fixed-pole winding with that of the step motor at the track number $n_1$, and in the case of FIG. 1, the relationship between $n_1$ and $n_2$ is expressed by $n_2 = n_1 + 6$.

(d) Moreover, positions denoted by track numbers $n_3$ and $n_4$ at which the rotational angle $n\theta$ of the pulley is $\pm \pi/2$ rad. respectively are set as third and fourth reference positions in relation to that of the track number $n_1$ (in other words, the track numbers $n_3$ and $n_4$ are determined to be $n_3 = n_1 - (\pi/2\theta)$ and $n_1 + (\pi/2\theta)$ respectively).

(e) Furthermore, positions denoted by track numbers $n_5$ and $n_6$ which are located in the vicinity of those of the track numbers $n_1$ and $n_2$ and at which stoppage is made in the state of a different fixed-pole winding of the step motor being excited are set as fifth and sixth reference positions in relation to those of the track numbers $n_1$ and $n_2$. In this case, $n_5$ and $n_6$ are determined to be $n_5 = n_1 + 3$ and $n_6 = n_2 + 3$, since restrictions are imposed, with respect to the measurement of an off-track amount, on the tracks adjacent closely to those of the track numbers $n_1$ and $n_2$.

In the present embodiment, accordingly, the first reference position is set at the substantially central one of all the tracks, and then the tracks serving as the second to sixth references are determined as follows:

$n_2 = n_1 + 6$, $n_3 = n_1 - (\pi/2\theta)$, $n_4 = n_1 + (\pi/2\theta)$, $n_5 = n_1 + 3$, $n_6 = n_1 + 9$.

(f) At the above-stated tracks totaling six, off-track amounts corresponding to the directions of movement (the inner circumferential direction and the outer circumferential direction) of a positional mechanism are measured with respect to heads on both sides respectively, and the following values are obtained therefrom. Of these values, those corresponding to the tracks $n_1$ to $n_6$ are denoted by annexed numerals 1 to 6, and those corresponding to the directions of movement by annexed characters i (the movement in the inner circumferential direction) and o (the movement in the outer circumferential direction) respectively, while off-track amounts corresponding to the heads on both sides are denoted by $\alpha$ and $\beta$.

$\alpha_{i1}, \alpha_{i2}, \alpha_{i3}, \alpha_{i4}, \alpha_{i5}, \alpha_{i6}$
$\beta_{i1}, \beta_{i2}, \beta_{i3}, \beta_{i4}, \beta_{i5}, \beta_{i6}$
$\alpha_{o1}, \alpha_{o2}, \alpha_{o3}, \alpha_{o4}, \alpha_{o5}, \alpha_{o6}$
$\beta_{o1}, \beta_{o2}, \beta_{o3}, \beta_{o4}, \beta_{o5}, \beta_{o6}$ Since a head offset is fixed substantially over all the tracks, as described previously, an equation $\beta_{i1} = \alpha_{i1} + H$ is established when the amount of the head offset is denoted by H, and thus the amount H is generally expressed in equations $\beta_{ij} = \alpha_{ij} + H$ and $\beta_{oj} = \alpha_{oj} + H$ ($j = 1$ to 6). Accordingly, $\alpha_{i1}$ and $\beta_{i1}$ are measured at an arbitrary point of $j = 1$ to 6, at a point of $j = 1$ herein, H is determined from $H = \beta_{i1} - \alpha_{i1}$, and thus $\beta_{i1}$ to $\beta_{i6}$ and $\beta_{o1}$ to $\beta_{o6}$ can be found.

Accordingly, it suffices that the measurement of off-tracks is conducted with respect to $\alpha_{i1}$ to $\alpha_{i6}$ for the head on one side, $\alpha_{o1}$ to $\alpha_{o6}$ at the time of its movement in the reverse direction, and $\beta_{i1}$, totaling thirteen amounts. Thus the measurement according to the present invention is much simplified in comparison with the measurement of off-tracks totaling 600 in the forward and backward directions on both sides in a system in which the number of tracks is about 150. In addition, the head offset H may be measured with respect to both $\beta_{i1}$ and $\beta_{o1}$ and determined by the following equation so as to improve the precision of measurement (in this case, the measurement of off-tracks is conducted with respect to fourteen amounts).

$$H = \frac{(\beta_{i1} - \alpha_{i1}) + (\beta_{o1} - \alpha_{o1})}{2}$$

Next, a description will be made on a method for adjustment and correction based on the measured values of the above-stated thirteen or fourteen off-track amounts. It is assumed that the off-track amounts $\alpha_{i1}$ to $\alpha_{i6}$ of the head on one side at the time of its movement from the track number 0 toward N corresponding to tracks $n_1$ to $n_6$ and the off-track amount $\beta_{i1}$ of the head on the other side at the track number $n_1$ are determined, as shown in FIG. 1. In the figure, the alternate long and short dash line $A_0$ is equivalent to a line drawn through off-track amounts obtained in the case when the fixed-pole winding of the step motor is one and the same, while an alternate long and two short dashes line $A_1$ is equivalent to a line drawn through off-track amounts of positioning tracks for which another winding is used. A broken line $A_2$ shows the same case as shown by the alternate long and short dash line in which the measurement is made for the head on the other side.

First, a value to be used for correcting the error resulting from the radius of the pulley, the thickness of the belt and the eccentricity of the pulley and a current relative deviation is determined. Since the alternate long and short dash line $A_0$ of FIG. 1 represents the sum of a straight line B and a sine wave of amplitude 2e of FIG. 6, the following equation can be established as a general formula.

$\Delta n = (P \cdot n\theta + Q) + e(1 - \cos(n\theta + \phi))$      equation (5)

P, Q, e and $\phi$ are unknown constants. Since the off-track amounts $\alpha_{1i}$, $\alpha_{2i}$, $\alpha_{3i}$ and $\alpha_{4i}$ at $n=n_1$, $n_2$, $n_3$ and $n_4$ can be measured, these values thus known are substituted for the values in the equation (5), and thereby the following equations are obtained.

$$\alpha_{i1} = Pn_1\theta + Q + e(1-\cos(n_1\theta+\phi)) \quad \text{equation (6)}$$

$$\alpha_{i2} = Pn_2\theta + Q + e(1-\cos(n_2\theta+\phi)) \quad \text{equation (7)}$$

$$\alpha_{i3} = Pn_3\theta + Q + e(1-\cos(n_3\theta+\phi)) \quad \text{equation (8)}$$

$$\alpha_{i4} = Pn_4\theta + Q + e(1-\cos(n_4\theta+\phi)) \quad \text{equation (9)}$$

By setting up these expressions as simultaneous equations and solving them, the unknown constants P, Q, e and $\phi$ can be determined easily. In other words, P, Q, e and $\phi$ in the foregoing equation (5) are unknown constants respectively, and they can be determined by solving the simultaneous equations formed of the aforesaid four expressions (6) to (9).

Since $n_3 = n_1 - (\pi/2\theta)$ and $n_4 = n_1 + (\pi/2\theta)$ on the occasion, the equations (8) and (9) can be rewritten as $$\alpha_{i3} = P\left(n_1\theta - \frac{\pi}{2}\right) + Q + e(1 - \sin(n_1\theta + \phi)) \quad \text{equation (10)}$$

$$\alpha_{i4} = P\left(n_1\theta + \frac{\pi}{2}\right) + Q + e(1 + \sin(n_1\theta + \phi)), \text{equation (11)}$$

and thus P, Q, e and $\phi$ can be determined easily. Values thus obtained are substituted into the equation (5), a maximum value $\alpha_{max}$ and a minimum value $\alpha_{min}$ are determined within a range of $n=0$ to N, a correction amount $Cor_1$ is determined therefrom by the following equation $$Cor_1 = \alpha_{i1} - \frac{\alpha_{max} + \alpha_{min}}{2}, \quad \text{equation (12)}$$

and thereby an optimum correction amount at the current $n_1$ track can be determined.

This means that, when $n_1$ is used as a track for adjustment, for instance, such an adjustment as making an off-track amount $\alpha'_{1i}$ at $n_1$ equal to $Cor_1$ optimizes the off-track resulting from the radius of the pulley, the eccentricity of the pulley and the thickness of the belt described above and the error to be adjusted, in relation to the head on one side.

(g) Although the correcting method described above is excellent in correctness, it requires somewhat troublesome processes of calculation. In the case of a positioning mechanism of which the aforesaid machining precision is so improved as to attain $\alpha_{max} - \alpha_{min} \leq 10$ $\mu$m approx., the following method for correction may also be adopted in place of the above-described method. Since $\alpha_{i1}$ can be regarded as approximately equal to $\alpha_{i2}$ in this case, an average off-track amount $\Delta ave_1$ of all tracks is determined by $$\begin{aligned}\Delta ave_1 &= \tfrac{1}{4}(\alpha_{i1} + \alpha_{i2} + \alpha_{i3} + \alpha_{i4}) \\ &\approx \tfrac{1}{4}(2\alpha_{i1} + \alpha_{i3} + \alpha_{i4}),\end{aligned} \quad \text{equation (13)}$$

and then a correction amount $Cor_1'$ can be determined by $$Cor_1' = \alpha_{i1} - \Delta ave_1 \quad \text{equation (14),}$$

Figure 2:
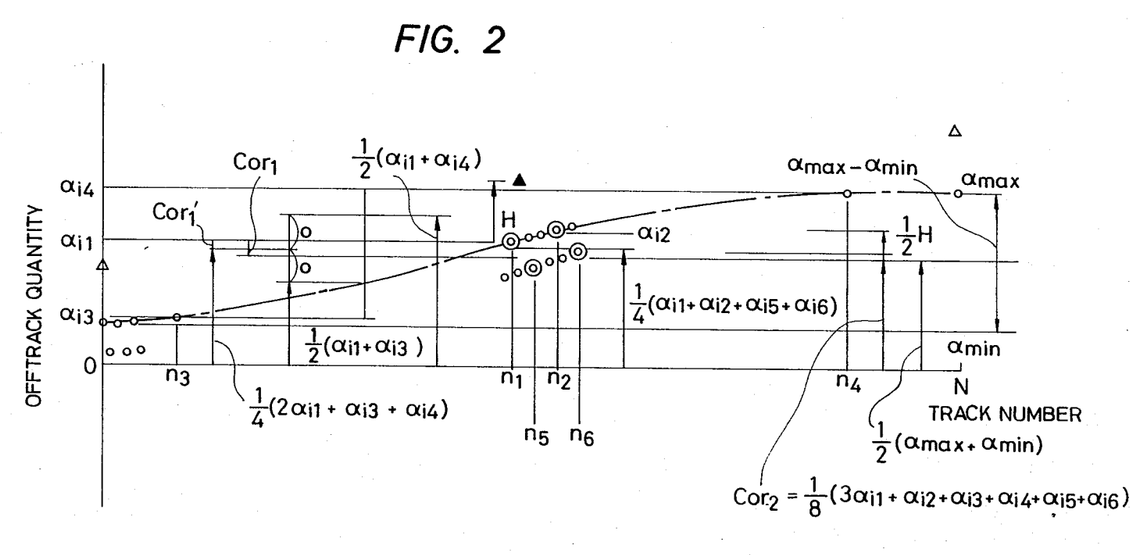

When $\alpha_{max} - \alpha_{min} = 10$ $\mu$m, in FIG. 2, the difference between $Cor_1'$ and $Cor_1$ is such that $Cor_1' \approx 0.5$ $\mu$m and $Cor_1 \approx 1$ $\mu$m, and therefore the amount $Cor_1'$ can be used satisfactorily from a practical point of view.

(h) Next, a description will be made on a method for correcting an off-track due to the angular precision of the step motor. In FIG. 1, the measurement of off-tracks for correcting the angular precision is conducted at tracks $n_1$, $n_2$, $n_5$ and $n_6$ indicated by a round mark with a black circle in the center respectively, and an average off-track amount $\Delta ave_2$ of the respective off-track amounts $\alpha_{i1}$, $\alpha_{i2}$, $\alpha_{i5}$ and $\alpha_{i6}$ of said tracks is determined by $$\Delta ave_2 = \tfrac{1}{4}(\alpha_{i1} + \alpha_{i2} + \alpha_{i5} + \alpha_{i6}) \quad \text{equation (15).}$$

From the expression (13) and the equation (15) a value $Cor._2$ for adjusting appropriately the off-tracks of all the tracks is obtained with respect to the head on one side.

$$\begin{aligned}Cor._2 &\approx \tfrac{1}{2}(\Delta ave_1 + \Delta ave_2) \\ &= \tfrac{1}{8}(3\alpha_{i1} + \alpha_{i2} + \alpha_{i3} + \alpha_{i4} + \alpha_{i5} + \alpha_{i6})\end{aligned} \quad \text{equation (16)}$$

Next, a value $\Delta Cor.$ for adjusting appropriately the off-tracks of all the tracks with respect to the heads on both sides can be obtained by adding a correction of the head offset H to the above value.

$$\begin{aligned}\Delta Cor. &= Cor._2 + \tfrac{1}{2}H \\ &= \tfrac{1}{8}(3\alpha_{i1} + \alpha_{i2} + \alpha_{i3} + \alpha_{i4} + \alpha_{i5} + \alpha_{i6}) + \\ &\quad \tfrac{1}{2}(\beta_{i1} - \alpha_{i1})\end{aligned} \quad \text{equation (17)}$$

Then, the step motor of FIG. 3 is moved to adjust the entire positioning mechanism so that $\Delta Cor.$ be equal to 0, and thereby an appropriate adjustment can be implemented When $\alpha_{i1} = 17$ $\mu$m, $\alpha_{i2} = 18$ $\mu$m, $\alpha_{i3} = 6$ $\mu$m, $\alpha_{i4} = 24$ $\mu$m, $\alpha_{i5} = 13$ $\mu$m and $\alpha_{i6} = 15$ $\mu$m and $\beta_{i1} = 25$ $\mu$m, for instance,
$\Delta Cor = \tfrac{1}{8}(3 \times 17 + 18 + 6 + 24 + 13 + 15) + \tfrac{1}{2}(25 - 17) \approx 20$ $\mu$m, and if adjustment is conducted so that $\alpha_{i1}' = \alpha_{i1} - \Delta Cor = 17 - 20 = -3$ $\mu$m, $\Delta max = 32$ $\mu$m and $\Delta min = 1$ $\mu$m are turned to be $\Delta max' = 12$ $\mu$m and $\Delta min' = -19$ $\mu$m respectively, thus the well-balanced result of adjustment being obtained.

(i) Next, when a positioning mechanism has hysteresis and consequently there is a different in a position of stoppage between forward and backward movements, the following equation is derived from the above.

$$Cor._2' = (\tfrac{1}{8}(3\alpha_{i1} + \alpha_{i2} + \alpha_{i3} + \alpha_{i4} + \alpha_{i5} + \alpha_{i6}) + \tfrac{5}{8}(3\alpha_{o1} + \alpha_{o2} + \alpha_{o3} + \alpha_{o4}\alpha_{o5} + \alpha_{o6})) \times \tfrac{1}{2}$$

Thus, a value $\Delta cor'$ can be determined by $$\Delta cor' = Cor._2' + \tfrac{1}{2}H \quad \text{equation (18).}$$

As above described, appropriate off-track adjustment is enabled by measuring the off-tracks of the double-side head at tracks for adjustment within the entire range of movement and the off-tracks on one side at positions whereat the rotational angles of the pulley are $\pm \pi/2$ rad., as well as one track located in the vicinity of the track for adjustment and having the same excitation phase with that of the track for adjustment and the off-tracks on one side of tracks corresponding to other excitation phases. A value for adjustment may be determined also by the above equation (17) when the hysteresis can be reduced by the apparatus disclosed in the Official Gazettes on Japanese Patent Laid-Open No. 15273/1982 and Japanese Patent Laid-Open No. 15274/1982. Moeover, it is also possible to dispense with the measurement at the tracks $n_5$ and $n_6$ and $n_6$ when the positioning is conducted only for the same excitation phase. In this case, the value $\Delta$cor. is given by $$\Delta\text{cor}'' = \frac{1}{4}(2\alpha_{i1} + \alpha_{i3} + \alpha_{i4}) + \frac{1}{2}(\beta_{i1} - \alpha_{i1}) \qquad \text{equation (19)}$$

and the same procedures as the above are taken thereafter,

Next, while the tracks $n_3$ and $n_4$ for measuring off-tracks, shown in FIG. 6, are provided at the positions of $\pm\pi/2$ rad. to the track $n_1$ for adjustment, $n_3$ and $n_4$ may be set at positions of the maximum stroke of the pulley when the rotational angle thereof is within $\pm\pi/2$ rad., and the adjustment is conducted in the same procedures as the above in this case as well.

Since the constitution and operation are such as described above, the adjustment of the positioning mechanism can be implemented with off-track amounts leveled over all the tracks, and as the result the off-track amounts can be lessened. Thus, the present invention is effective for making high the density of tracks.

We claim:

1. A method of adjusting the position of an object to be moved in a positioning mechanism which is provided with a step motor having a plurality of fixed-magnetic-pole windings and a rotary shaft rotated by the selective excitation of said fixed-magnetic-pole windings, a pulley fitted to said rotary shaft, a belt wound on said pulley, and a carriage to which a part of said belt is connected and which supports the object to be moved, and which moves the aforesaid object to a plurality of target positions in such a manner that the aforesaid step motor rotates the rotary shaft so that the belt wound on said pulley can make the carriage move forward and backward comprising:

a first step of calculating amounts of deviation of said object from a respective target position as the object is moved to different ones of a plurality of different target positions, said amounts of deviation resulting from the dimensional errors of the aforesaid pulley and belt;

a second step of sampling said amount of deviation at at least three of the aforesaid target positions to which the object is moved and measuring amounts of deviation at the sampled target positions;

a third step of substituting the amount of deviation at the three target positions obtained by said measuring step into said calculation of amounts of deviation obtained by the aforesaid calculating step so as to obtain the upper and lower limit values of the amounts of deviation calculated by the calculating step; and a fourth step of adjusting the position of the aforesaid object to be moved, by the average value of the upper and lower limit values obtained by the aforesaid step.

2. A method of adjusting the position of an object to be moved claimed as claim 1, wherein the aforesaid second step of measuring the amounts of deviation relates to three sampled target positions out of a plurality of target positions, and said three target positions are a substantially central target position and target positions reached by rotating the step motor from said central target position by $\pm\pi/-2$ rad. out of a plurality of target positions.

3. A method of adjusting the position of an object to be moved claimed as claim 1, wherein the aforesaid second step of measuring the amounts of deviation relates to six sampled target positions out of a plurality of target positions, and said six target positions are the substantially central target position $n_1$, the target positions $n_4$ and $n_5$ reached by rotating the step motor from said central target position $n_1$ by $\pm\pi/2$ rad., a target position $n_2$ whereat said object moved by rotating the step motor from said central target position steps in the state wherein the same fixed-magnetic-pole winding of said motor with the fixed-magnetic-pole winding excited at said central target position is excited, and target positions $n_3$ and $n_6$ whereat the object moved by the step motor from said central target position $n_1$ and the target position $n_2$ stops in the state where a fixed-magnetic-pole winding different from the fixed-magnetic-pole winding excited at the aforesaid target position $n_2$ is excited.

4. A method of adjusting the position of an object to be moved claimed as claim 3, wherein the aforesaid second step implements sampling at the aforesaid six target positions $n_1$ to $n_6$ on the occasions of forward and backward movements of the object to be moved.

5. A method of adjusting the position of an object to be moved claimed as claim 4, wherein the object to be moved is a magnetic head, and a plurality of target positions are located at data tracks provided in concentric circles on a magnetic disk.

6. A method of adjusting the position of an object to be moved claimed as claim 5, wherein the positioning mechanism has two magnetic heads mounted for simultaneous movement along opposite sides of the magnetic disk, the aforesaid second step of measuring the amounts of deviation contains the measurement of an amount of the relative positional deviation of the aforesaid two magnetic heads, and the aforesaid fourth step contains an adjustment effective to match the relative positions of the aforesaid two magnetic headd with each other.

7. A method of adjusting the position of an object to be moved claimed as claim 5, wherein the positioning mechanism moves the magnetic head linearly in a radial direction of the magnetic disk.

8. A method of adjusting the position of an object to be moved claimed as claim 5, wherein the aforesaid positioning mechanism moves the magnetic head in a circular-arc manner substantially in a radial direction of the magnetic disk.

9. A method of adjusting the position of an object to be moved in a positioning mechanism making said object move forward and backward along a prescribed track and positioning the object at a plurality of target positions on said track, comprising:

a first step of calculating the displacement amounts of deviation of the object along the prescribed track, which results from the mechanical errors in dimensions of said positioning mechanism;

a second step of sampling and measuring amounts of deviation at three points at least in the course of the prescribed track, while the aforesaid object is being moved alionng the prescribed track;

a third step of comparing the amounts of deviation sampled by the aforesaid second step with those sampled by the first step and calculating the upper and lower limit values of deviation on the aforesaid prescribed track; and a fourth step of adjusting the position of the object so that the upper and lower limit values of deviation obtained by said third step are averaged on the track.

10. A method of adjusting the position of an object to be moved claimed as claim 9, wherein the object to be moved is a magnetic head, and the prescribed track traverses a plurality of information tracks provided in concentric circles on a magnetic disk.

11. A method of adjusting the position of an object to be positioned in a positioning mechanism which is provided with a step motor rotating and driving a rotary shaft in a stepped manner, a motion converting means for converting a force of rotating motion of said rotary shaft into a force of linear motion, a body to be moved which is moved by the force of linear motor obtained from the conversion by said motion converting means, and the object to be positioned which is mounted on said body to be moved, and which positions said object to target positions by the rotating motion of the step motor, comprising:

a measurement step of measuring the amounts of deviation of said object from target positions on the track of movement of the object;

a calculation step of calculating with respect to a reference position assumed to have no deviation the upper and lower values of deviation within the track of movement of the aforesaid object on the basis of the amounts of deviation obtained by said measurement step; and a step or adjusting a mounting position of the object mounted on said body so that the upper and lower limit values of deviation obtained by said calculation step are averaged.

12. A method of adjusting the position of an object to be positioned claimed as claim 11, wherein the calculation step contains the measurement of the amounts of deviation resulting from the structural errors in dimensions of the motion converting means and the measurement of the amounts of deviation resulting from the structural errors of the step motor.

13. A method of adjusting the position of an object to be positioned claimed as claim 12, wherein the measurement of the amounts of deviation caused by the motion converting means in the measurement step is conducted at three positions on the track of movement of the object.

14. A method of adjusting the position of an object to be positioned claimed as claim 13, wherein the measurement last mentioned is conducted at two positions in the vicinity of the center of the aforesaid track of movement and at two positions in the opposite ends thereof to provide measurements at four positions in total.

15. A method of adjusting the position of an object to be positioned claimed as claim 13, wherein the measurement is conducted at one central position on the track of movement and at two positions in the opposite ends thereon to provide measurements, at three positions in total.

16. A method of adjusting the position of an object to be positioned claimed as claim 12, wherein the measurement of the amount of deviation caused by hysteresis of the step motor in the measurement step is conducted with respect to an amount of deviation in each excitation phase of the step motor.

17. A method of adjusting the position of an object to be positioned claimed as claim 16, wherein the step motor is of four phases, and the measurement by the measurement step is conducted with respect to amounts of deviation in four excitation phases when the object to be positioned is moved from a target position to another by the two-step rotation of the step motor.

18. A method of adjusting the position of an object to be positioned claimed as claim 11, wherein the aforesaid measurement step contains the measurement of an amount of deviation between a plurality of objects to be positioned when the objects mounted on the body to be moved are on opposite sides of a rotating magnetic disk.

* * * * *